2,865,899
VINYLTHIOALKOXYTRIMETHYLSILANE AND POLYMERS THEREOF

Marvin J. Hurwitz, Elkins Park, and Peter L. de Benneville, Philadelphia, Pa., assignors to Rohm & Haas Company, Philadelphia, Pa., a corporation of Delaware No Drawing. Application May 12, 1955
Serial No. 507,971

4 Claims. (Cl. 260—79.7)

This invention relates to novel unsaturated alkoxysilanes which are adapted to be polymerized exclusively by addition polymerization.

It is an object of the present invention to provide novel polymerizable silanes which are adapted to produce linear polymers having a carbon-to-carbon linkage in the backbone of the polymer and containing silicon in the side branches thereof. Other objects and advantages of the invention will be apparent from the description hereinafter.

The monomeric compounds of the present invention have the structure of Formula I following:

I  $\quad CH_2=C(R)ZAOSi(R')_3$ where

R is H or methyl,
Z is —O—, —S—, —COO—, or —CONH—,
A is a cyclohexylene or alkylene group having 2 to 8 carbon atoms; preferably 2 to 4 carbon atoms, at least two thereof extending in a chain between the adjacent O and Z group,
R' is alkyl or aryl.

A preferred group is that having the structure of Formula II following:

II  $\quad CH_2=CHYAOSi(R')_3$ where A and R' have the same definition as before and Y is O or S.

The monomeric compounds may be produced by the reaction of a compound having the structure of Formula III following with any one of several types of compounds having the structures of Formulas IV, V, and VI following respectively:

III $\quad CH_2=C(R)ZAOH$
IV $\quad (R')_3SiCl$
V $\quad (R')_3SiNR^2R^3$
VI $\quad (R')_3SiOR^4$ where the symbols have the same definitions as above except that $R^2$ and $R^3$ together may be the morpholino residue $=(C_2H_4)_2O$, the piperidino residue $—C_5H_{10}—$ or the pyrrolidino residue $—C_4H_8—$, and separately $R^2$ may be phenyl, aralkyl (such as benzyl), cyclohexyl, or an alkyl group having 1 to 18 carbon atoms, and $R^3$ may be hydrogen, aralkyl (such as benzyl) or an alkyl group having 1 to 18 carbon atoms, with the proviso that when $R^2$ is an alkyl group having a tertiary carbon atom attached to the nitrogen atom, $R^3$ must be hydrogen, the total number of carbon atoms in both $R^2$ and $R^3$ preferably being about four, and $R^4$ is an alkyl group, preferably having 1 to 4 carbon atoms.

The preparation of the monomeric compounds by the reaction of compounds of Formulas III and IV respectively may be carried out in an anhydrous solvent, such as benzene, toluene, xylenes or tertiary amines, such as trimethylamine, triethylamine, pyridine, quinoline and the like at a temperature of about −20° C. to room temperature, preferably between −5° C. and +10° C. The reaction is rapid and exothermic and, therefore, it is preferred to add one of the reactants to a solution of the other in benzene at a rate that is sufficiently slow to enable proper control of the temperature by cooling means. Generally, reaction is complete at the end of the addition of one reactant to the other. This reaction must be effected in the presence of a tertiary amine to take up the hydrogen chloride liberated. By proceeding in this manner, the maximum yield is obtained and there is a minimum formation of by-products resulting from the action of hydrogen chloride on the compound of Formula III. Sufficient tertiary amine should be added to take up all of the hydrogen chloride liberated and preferably an excess over this amount is used.

A preferred manner of preparing the monomeric compounds of the present invention is that which involves the reaction of compounds having the formulas of III and V respectively. In this reaction, no solvent is needed and it is effected by heating. A free amine is liberated by the condensation of the silyl amine of Formula V with the hydroxy compound of Formula III. The temperature may be varied depending upon the boiling point of the amine liberated ($NHR^2R^3$), and when a high boiling amine is used which would require temperatures above about 100° C. to effect distillation, it is preferable to employ a vacuum to enable a lower temperature to be maintained in the reaction system. The distillation of the amine formed on condensation leaves the desired product substantially free of impurities. No special step or steps for separating or purifying the product of Formula I is required.

A third method of making the compounds is to react compounds of Formulas III and VI together. Condensation of these two types of compounds liberates a free alcohol having the formula $R^4OH$. As in the preceding method, no solvent need be used. The reactants are simply mixed and heated to reflux with simultaneous liberation of the alcohol. Whereas the preceding method in which an amine is liberated requires a short time on the order of one-half an hour to an hour or so, this method in which an alcohol is liberated, is considerably slower requiring a time which may vary from 4 to 24 hours or more. Again, the temperature may vary from about 150° C. down to 50° to 60° C. depending on the particular alcohol liberated and whether vacuum is employed. The monomers thus produced may be polymerized either in bulk (when they are liquid or low-melting solids), or in solution, such as in benzene, toluene, xylenes, solvent naphthas, acetone, dioxane, acetonitrile, dimethylformamide or dimethylacetamide. The temperature of polymerization may be from about 45° C. to 100° C. or higher. The polymerization may be accelerated by free radical initiators such as benzoyl peroxide, acetyl peroxide, lauryl peroxide, cumene hydroperoxide, or preferably those of the azo type such as azoisobutyronitrile and the esters and amides of azoisobutyric acid such as the methyl, ethyl, isopropyl or butyl esters and the simple amides or N-substituted amides including the N-methyl amide. The time of polymerization may vary from 2 to 24 hours.

The compounds may be homopolymerized by these methods or copolymerized thereby. Examples of comonomers that may be polymerized with the unsaturated silanes of the present invention include acrylonitrile, vinyl chloride, vinylidene chloride, tetrafluoroethylene, the vinyl aromatic compounds, more particularly the vinyl aromatic hydrocarbons (e. g., styrene, isopropenyl toluene, vinyl toluene, the various dialkyl styrenes, etc.), other aliphatic compounds containing a $CH_2=C<$ grouping, e. g. the various substituted acrylonitriles (e. g., methacrylonitrile, ethacrylonitrile, phenylacrylonitrile, etc.), acrylamide and the various substituted acrylamides (e. g. methacrylamide, ethacrylamide, the various N-substituted acrylamides which are different from those used in practicing the present invention and the various N-substituted alkacrylamides, for instance N-methylol acrylamide, N-monoalkyl and -dialkyl acrylamides and methacrylamides, e. g. N-monomethyl, -ethyl, -propyl, -butyl, etc. and N-dimethyl, -ethyl, -propyl, -butyl, etc., acrylamides and methacrylamides, N-monoaryl and -diaryl acrylamides and alkacrylamides, e. g. N-monophenyl and -diphenyl acrylamides and methacrylamides, etc.), vinyl esters, e. g. vinyl acetate, vinyl propionate, vinyl butyrate, vinyl isobutyrate, vinyl valerate, etc., esters of an acrylic acid (including acrylic acid itself and the various alpha-substituted acrylic acids, e. g. methacrylic acid, ethacrylic acid, phenylacrylic acid, etc.), more particularly the alkyl esters of an acrylic acid, e. g., the ethyl, propyl, isopropyl, n-butyl, isobutyl, sec-butyl, tert-butyl, amyl, hexyl, heptyl, octyl, decyl, dodecyl, hexadecyl, octadecyl, etc. esters of acrylic, methacrylic, ethacrylic, phenylacrylic, etc. acids, vinyl ethers, such as butyl vinyl ether, N-vinyl compounds such as N-vinyl pyrollidone, and olefins, such as ethylene, fluorinated vinyl compounds, such as vinylidene fluoride, as well as other vinyl aromatic and vinyl aliphatic compounds, and other compounds containing a single $CH_2=C<$ grouping.

The polymers obtained may be viscous liquids to resinous solids which are permanently thermoplastic in character by virtue of the linear backbone of carbon-to-carbon bonds. The polymers and copolymers are extremely flexible and tough, which property seems to be attributable to the alkoxy linkage between the backbone of the polymer and the silicon-containing terminus of the branch chains in the polymer.

The solid polymers may be formed into films, sheets, rods, and tubes by conventional molding operations either involving the casting of solutions or the extruding or otherwise forming of either solutions or melts of the polymers. The solid polymers are characterized by a relatively low degree of tackiness as compared to similar polymers containing no silicon. By virtue of this character they have a correspondingly reduced tendency to adhere to heated objects used in their formation, such as heated molds or drying, calendering or other heated rolls, cylinders, and so forth, especially when these objects are formed of such materials as stainless steel, aluminum or monel metal. The viscous liquid polymers and copolymers are useful as hydraulic transmission media such as in hydraulic power systems including hydraulic lifts and brakes. They are also useful as lubricants or as lubricant-additives. For example, 5% to 25% by weight of a homopolymer or copolymer with such higher alkyl methacrylates as lauryl, cetyl or stearyl methacrylates may be incorporated into neutral mineral oil to improve the viscosity index. The presence of the terminal silicon-containing groups in the copolymers apparently accounts for the improved temperature-viscosity relationship. The resinous solid polymers and copolymers may be used for forming all sorts of coatings for wood, textile, fabrics, paper, leather or the like. When so used, they may be pigmented or provided with fillers or delusterants. The thermoplastic nature of the solid polymers of the present invention makes them useful as binders which are adapted to be rendered thermoplastic on heating. For this purpose, they are particularly useful for adhering glass fibers or plates together.

In the following examples, which are illustrative of the present invention, the parts given are by weight unless otherwise noted:

*Example 1*

(a) To a stirred mixture of 89 parts of the monovinyl ether of ethylene glycol, 129.2 parts of quinoline and 90 parts of dry benzene, was added dropwise, the temperature being held at 0° to 5° C. by external cooling, a mixture of 108 parts of trimethylchlorosilane and 90 parts of dry benzene. When the addition was complete, the mixture was filtered, and the filtrate distilled to yield 35.2 parts of product, vinyloxyethoxytrimethylsilane, B. P. 147–9° C., $n_D^{25}$ 1.4110. Percent C found, 52.7; theory, 52.5. Percent H found, 10.3; theory, 10.1. Hydrogenation equivalent found, 172; theory, 160.3.

(b) To a stirred mixture of 89 parts of the monovinyl ether of ethylene glycol, 202.4 parts of triethylamine, and 540 parts of benzene was added, as above, a mixture of 108 parts of trimethylchlorosilane and 225 parts of benzene. The reaction mixture was worked up as described above to yield 103 parts (64%) of product, vinyloxyethoxytrimethylsilane.

(c) The procedure of part (b) hereof is repeated, substituting for the vinyl ether, 131 parts of 5-hydroxypentyl vinyl ether. The product is readily polymerizable in benzene to which 1% by weight (on the weight of vinoxypentoxytrimethylsilane) of azodiisobutyronitrile is added at a temperature of 85° C. The resinous homopolymer remains dissolved in the benzene and is recovered by evaporation of the benzene as a substantially colorless, thermoplastic mass. By casting the solution on a glass plate, a flexible film was obtained.

*Example 2*

(a) To a stirred mixture of 72.8 parts of β-hydroxyethyl vinyl sulfide, 142 parts of triethylamine and 378 parts of benzene, was added dropwise a solution of 75.5 parts trimethylchlorosilane and 157 parts of benzene, while the reaction temperature was maintained between 0° and 5° C. The mixture was filtered and the filtrate distilled to yield 92.2 parts (75%) of product, vinylthioethoxytrimethylsilane, B. P. 95–97° C./47, 84° C./22, 73° C./12 mm.; $n_D^{24}$ 1.5736; sp. gr. 0.91. Percent C found, 47.8; theory, 47.7. Percent H found, 9.0; theory, 9.2. Percent S found, 17.9; theory, 18.2. Hydrogenation equivalent found, 170.9; theory, 176.

(b) A mixture of 46 parts of β-hydroxyethyl vinyl sulfide and 48 parts of t-butylaminotrimethylsilane was heated to reflux and 17 parts (70%) of t-butylamine was removed. The reaction mixture was then distilled under vacuum to yield 58 grams (96%) of the product, vinylthioethoxytrimethylsilane.

(c) The procedure of part (b) hereof is repeated, substituting 158 parts of t-butylaminotriamylsilane for the silane used in part (b). The product, on being dissolved in benzene, polymerized therein with 0.8% of azodiisobutyronitrile, and cast on a smooth plate, produced tough, flexible film.

*Example 3*

To a stirred mixture of 44.5 parts of the monovinyl ether of ethylene glycol, 101.2 parts of triethylamine and 270 parts of benzene, was added a mixture of 147.4 parts of triphenylchlorosilane in 112 parts of dry benzene while the temperature of reaction was maintained at 0° to 5° C. The reaction mixture was then filtered and the filtrate was stripped. The stripping residue was 167.3 parts (96.6%) of product, vinyloxyethoxytriphenylsilane, M. P. 51–2° C., percent C found, 75.9; theory 76.3. Percent H found, 6.7; theory, 6.5. Hydrogenation equivalent found, 350; theory, 346.

*Example 4*

(a) To a stirred mixture of 51 parts of hydroxyethyl acrylate, 110 parts of triethylamine and 400 parts of dry benzene, was added dropwise a solution of 48 parts of trimethylchlorosilane in 108 parts of dry benzene, while the reaction mixture was maintained at 0° to 5° C. The mixture was then filtered and the filtrate distilled to yield 64 parts (78%) of product, acryloxyethoxytrimethylsilane, B. P. 46° C./0.7 mm. Hg., $n_D^{25}$ 1.4260. Hydrogenation equivalent found 186; theory, 188.

(b) Part (a) is repeated substituting $$HOC(CH_3)_2CH_2OOCC(CH_3)=CH_2$$

for the hydroxyethyl acrylate of part (a). The product, on being dissolved in benzene, polymerized therein with 0.8% of azodiisobutyronitrile, and cast on a smooth plate, produced a tough, flexible film.

Example 5

The procedure of Example 1(a) is followed, substituting 115 parts of N-hydroxyethyl acrylamide for the vinyl ether. The product, on being dissolved in benzene, polymerized therein with 0.8% of azodiisobutyronitrile, and cast on a smooth plate, produced a tough, flexible film.

Example 6

A degassed mixture of 72 parts of methyl methacrylate, 8 parts of vinylthioethoxytrimethylsilane and 0.056 part of diethyl azodiisobutyrate was polymerized in a closed glass mold at 60° C. for fourteen hours. The copolymer was obtained as a tough film on release from the mold. It had a tensile strength of 8030 lbs. per sq. in.

Example 7

A mixture of 90 parts of ethyl acrylate, 10 parts of vinylthioethoxytrimethylsilane, 100 parts of benzene, and 0.075 part of diethyl azodiisobutyrate was polymerized by adding dropwise to a flask maintained at 90° to 105° C. with stirring. The temperature was maintained for twenty-four hours. Films cast by pouring onto mercury and allowing the solvent to evaporate were substantially clear and flexible.

Example 8

A mixture of 80 parts of ethyl acrylate, 20 parts of vinylthioethoxytrimethylsilane, 100 parts of benzene, and 0.075 part of diethyl azodiisobutyrate was polymerized by adding dropwise to a flask maintained at 90° to 105° C. with stirring. The temperature was maintained for twenty-four hours. Films cast by pouring onto mercury and allowing the solvent to evaporate were tough and flexible.

Example 9

A mixture of 50 parts of ethyl acrylate, 50 parts of vinylthioethoxytrimethylsilane, 100 parts of benzene, and 0.075 part of diethyl azodiisobutyrate was polymerized by adding dropwise to a flask maintained at 90° to 105° C. with stirring. The temperature was maintained for twenty-four hours. Films cast by pouring onto mercury and allowing the solvent to evaporate were tough and flexible.

Example 10

A mixture of 80 parts of cetyl methacrylate and 20 parts of methacryloxyethoxytriethylsilane (obtained by the procedure of Example 4(a) from hydroxyethyl methacrylate and triethylchlorosilane) is polymerized in 500 parts of dry benzene containing 1 part of diethyl azodiisobutyrate. The copolymer, when added to mineral oil lubricants in an amount of 3% to 10% on the weight of the oil serves to improve the viscosity index, that is, it decreases viscosity changes with temperature.

It is to be understood that changes and variations may be made without departing from the spirit and scope of the invention as defined in the appended claims.

We claim:

1. As a new compound, vinylthioethoxytrimethylsilane.
2. A linear addition homopolymer of vinylthioethoxytrimethylsilane.
3. A linear addition copolymer of 10 to 50% by weight of vinylthioethoxytrimethylsilane with 50 to 90% by weight of ethyl acrylate.
4. A compound having the formula $$CH_2=CHSAOSi(CH_3)_3$$

where A is an alkylene group having 2 to 8 carbon atoms.

References Cited in the file of this patent

UNITED STATES PATENTS

| | | |
|---|---|---|
| 2,481,349 | Robie | Sept. 6, 1949 |
| 2,547,944 | Iler | Apr. 10, 1951 |

OTHER REFERENCES

McGregor: Silicones and Their Uses, 1954, published by McGraw-Hill Book Co., Inc., N. Y., page 229.